United States Patent

[11] 3,589,252

[72] Inventors Erich Hahn;
 Werner Hahn, both of Dresden, Germany
[21] Appl. No. 765,429
[22] Filed Oct. 7, 1968
[45] Patented June 29, 1971
[73] Assignee Veb Pentacon Dresden Kamera-und Kinowerke
 Dresden, Germany

[54] PHOTOGRAPHIC CAMERA WITH EXPOSURE-MEASURING DEVICE
 5 Claims, 2 Drawing Figs.
[52] U.S. Cl. .................................................. 95/10,
 95/42, 95/64
[51] Int. Cl. .................................................. G03b 7/02,
 G03b 9/07
[50] Field of Search .................................................. 95/10 C,
 42, 64, 64 B

[56] References Cited
 UNITED STATES PATENTS
| | | | |
|---|---|---|---|
| 3,081,685 | 3/1963 | Schlapp et al. | 95/64 B |
| 3,082,672 | 3/1963 | Swarofsky et al. | 95/10 C |
| 3,427,946 | 2/1969 | Broschke et al. | 95/10 C X |
| 3,465,661 | 9/1969 | Hahn et al. | 95/64 B X |
| 3,489,071 | 1/1970 | Mohr et al. | 95/64 B |

Primary Examiner—Samuel S. Matthews
Assistant Examiner—Joseph F. Peters, Jr.
Attorney—Young and Thompson ABSTRACT: A photographic camera having an interchangeable objective lens and a spring diaphragm having an aperture control is provided with an exposure measuring device enabling exposure measurement to be selectively performed at maximum diaphragm aperture closeable by operation of the shutter release to a measured aperture required for accurate exposure or at a predetermined working aperture as desired. The exposure measuring circuit includes a photoelectric cell influenced by light passing through the objective lens connected in a balancing circuit with adjustable resistive means influenced by the exposure time and film sensitivity controls of the camera and a supply voltage. An indicating means indicates the state of balance of the circuit. An opening means holds the diaphragm in a fully open position and a diaphragm setting means permits closure of the diaphragm to a measured position on actuation of the camera shutter release. A stop-setting member influences the reading of the indicating means and moves a stop which defines at balance the measured aperture. The stop engages the setting means when the shutter release is actuated. A switch means permits the diaphragm to be connected or disconnected from the aperture control to enable measurement to be made at working aperture or at maximum aperture as desired.

3,589,252

PHOTOGRAPHIC CAMERA WITH EXPOSURE-MEASURING DEVICE

BACKGROUND OF THE INVENTION

The invention relates to a photographic camera with an exposure-measuring device, the photoelectric cell of which is illuminated by the light passing through the camera lens, the lens diaphragm of which is presettable by a stop-setting member coupled with the exposure-measuring device and also capable of stopping down to the preset value from full aperture to the preset working aperture.

In cameras of this kind the exposure measurement can take place while the lens diaphragm is at full aperture, the preset diaphragm value being introduceable into the exposure-measuring device by means of the stop-setting member settable according to the measure of a diaphragm scale, in that adjustable components of the exposure-measuring device, such as rotatable measuring mechanism or adjustable resistance, are geared with the stop-setting member.

The invention has the purpose of improving the known cameras with regard to the carrying out of exposure-measurement according to choice with the lens diaphragm set to full aperture or working aperture, and has for its object the provision of an exposure-measuring device in which the settable diaphragm values can be taken into consideration according to choice by gear connection of the measuring device with the stop-setting member for the lens diaphragm or by the different working apertures of the lens diaphragm at which the exposures are made.

SUMMARY OF THE INVENTION

According to the invention this is achieved in a photographic camera having a housing, a shutter release means mounted on the housing, exposure time and film sensitivity controls mounted on the housing and an interchangeable objective lens assembly mounted on the housing having a spring diaphragm with an aperture control, the provision of an exposure measuring device mounted on the housing including:
  a. a source of supply voltage,
  b. a photoelectric cell disposed in the path of rays passing through the objective lens and connected in circuit with the source of supply voltage,
  c. an adjustable resistive means connected in a balancing circuit with the photoelectric cell and influenced by the exposure time and film sensitivity controls of the camera,
  d. an indicating means connected in circuit with the resistive means and the photoelectric cell and adapted to indicate the state of balance of the balancing circuit,
  e. opening means for holding the diaphragm in a fully open position,
  f. diaphragm setting means actuable by the shutter release to move the diaphragm away from the fully open position to an aperture required for accurate exposure
  g. a stop moveable by a stop setting member adapted to influence the reading of the indicating means which stop is connectable with the diaphragm setting means when the shutter release is operated, to define at balance the required aperture and
  h. switch means adapted to selectively disengage or engage the diaphragm setting means from the stop and to connect or disconnect the diaphragm to the aperture control whereby exposure measurement is enabled at a working aperture preset by the aperture control or at maximum aperture automatically closeable to a measured value respectively. The stop-setting member coupled with the exposure-measuring device is expediently settable according to a diaphragm scale which is settable opposite to a reference mark indicating the initial position of the stop-setting member, according to the different initial apertures of the attachable interchangeable lenses. According to an advantageous development on the compensating setting member a diaphragm scale is arranged by which the compensating wetting member is settable in relation to the reference mark and the setting index of the stop-setting member is settable in the presetting of the lens diaphragm as a result of the stop-setting member. To simplify operation the changeover switch is expediently coupled with the compensating setting member, while in the case of the setting of the compensating setting member to a diaphragm value (initial aperture) readable opposite to the reference mark the lens diaphragm is presettable by the stop-setting member. The invention is explained by reference to an example of embodiment which is illustrated and described.

BRIEF DESCRIPTION OF DRAWINGS

FIG. 1 shows the exposure-measuring device after measurement with fully opened diaphragm with camera release pressed in.

Figure 1:
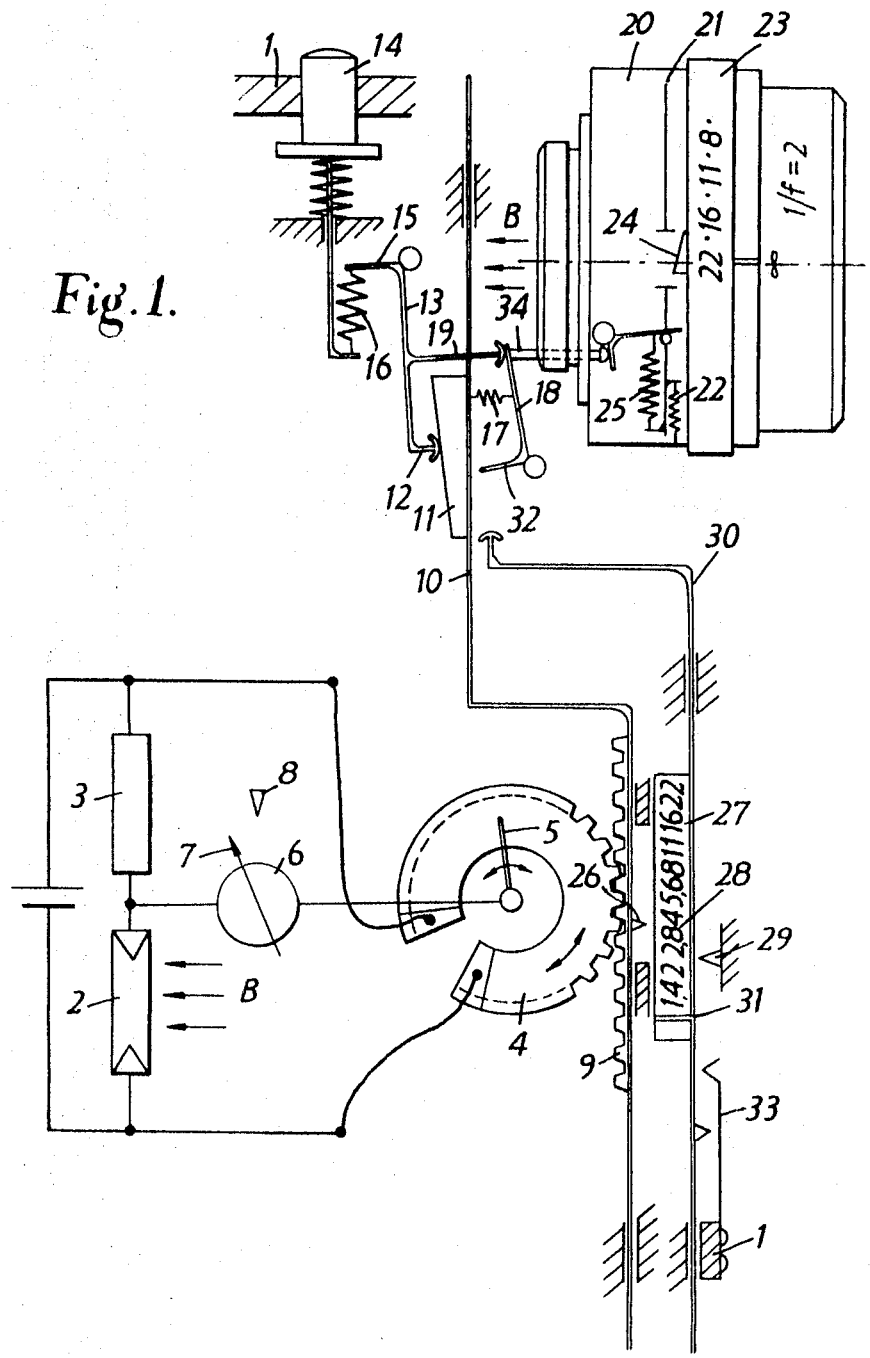

The compensating resistance 4 is mounted for rotation concentrically with the slider 5 and is in engagement with the rack 9 of the slideably mounted stop-setting member 10. The stop cam 11 of the stop-setting member 10 is arranged in the path of the stop arm 12 of a closer lever 13. The operating arm 15 of the closer lever 13 is coupled through the spring 16 with the camera release 14.

The closer lever 13 further comprises a closer arm 19 against which the return spring 17 seeks to place a closer rocker 18. In the pivoting range of the closer rocker 18 there is the closer plunger 34 of the attachable interchangeable lens 20. The opening spring 22 anchored in the lens housing seeks constantly to draw the lens diaphragm 21 into the full aperture. The presetting ring 23 on the lens possesses a setting stop 24. On pressing in of the closer plunger 34, the lens diaphragm 21 is entrained by the closer spring 25 against the opening spring 22 and closed to the diaphragm value set on the presetting ring 23, according to the position of the setting stop 24.

Figure 2:
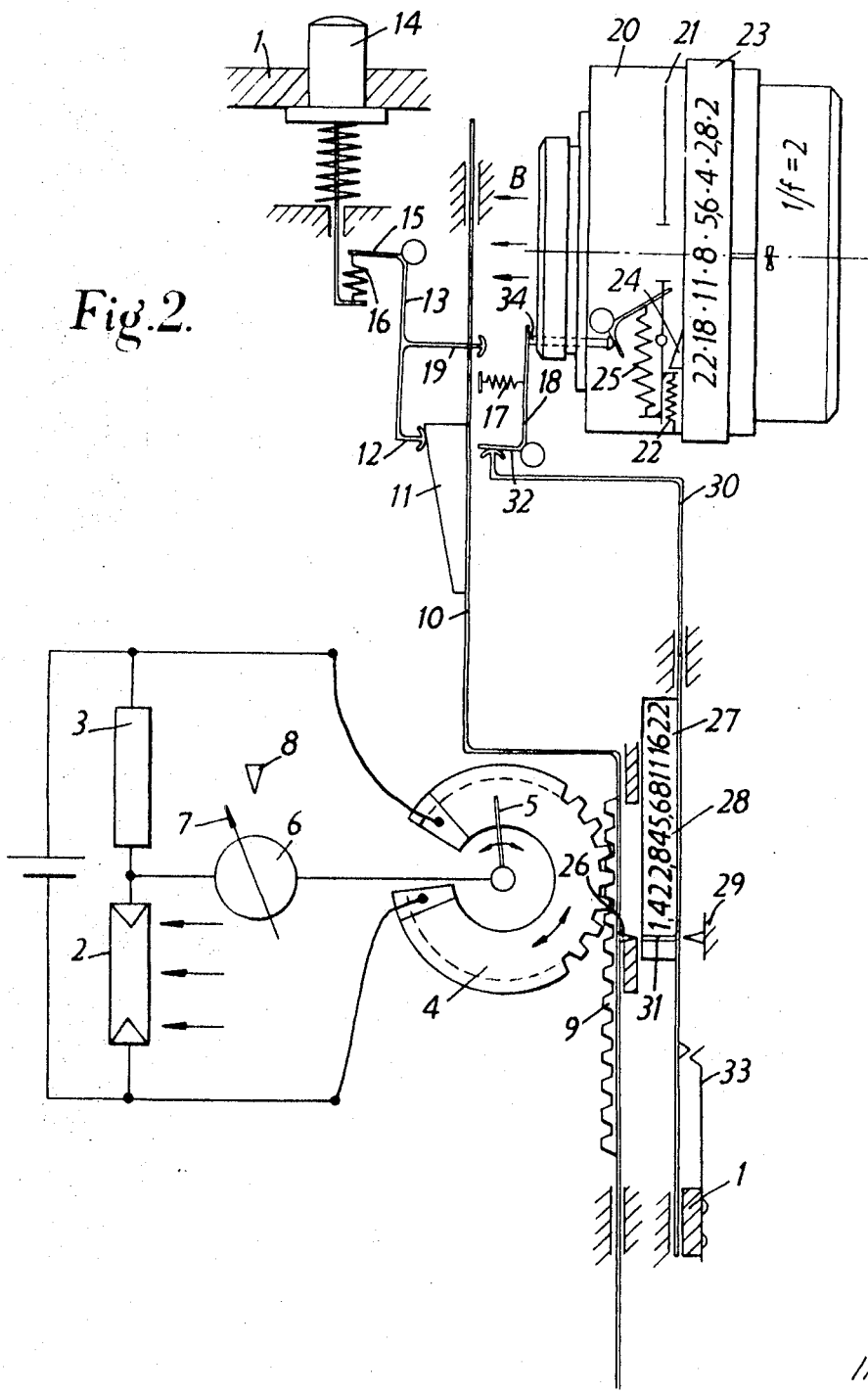
FIG. 2 shows the exposure-measuring device during the measurement with diaphragm partially closed to working aperture. The exposure-measuring device, consisting of the bridge circuit with the photoconductive cell 2, the adjusting resistance 3 and the compensating resistance 4, is arranged in a camera housing 1 which is only partially illustrated. The photoconductive cell 2 is illuminated in known manner by the picture-taking ray path B. The slider 5 of the compensating resistance 4 is connected with the galvanometer 6 lying in the diagonal branch of the bridge circuit, the pointer 7 of which galvanometer swings on to the measurement mark 8 on bridge balancing. The slider 5 is geared in known manner with the setting members for exposure time and film sensitivity, so that by rotation of the slider 5 in relation to the compensating resistance 4 the exposure time and the film sensitivity can be taken into consideration.

The stop-setting member 10 comprises a setting index 26. A compensating setting member 27 movable mounted parallel with the stop-setting member 10 is allocated to this setting index 26 and carries a diaphragm scale 28 and is settable opposite to the fixed reference mark 29. The compensating setting member 27 is rigidly connected with a changeover switch 30 the position of which is indicated by the setting mark 31. The changeover switch 30 can be brought into engagement with a switch arm 32 of the closer rocker 18, the closer rocker 18 being pivotable against the return spring 17 in the direction of pressing in of the closer plunger 19 (see FIG. 2). In this switch position the changeover switch 30 can be held fast against the return spring 17 and the opening spring 22 by the detent spring 33.

The manner of operation is as follows: If an exposure measurement is to be carried out with the lens diaphragm 21 fully opened (see FIG. 1), then the presetting ring 23 is rotated into the position corresponding to the smallest diaphragm aperture (in the present case "22"). Thus the setting stop 24 comes into its end position which renders lever 13 inoperative so that the lens diaphragm 21 is movable between the maximum and the minimum diaphragm aperture mechanically independently of the position of the setting stop 24. Furthermore according to the initial aperture of the lens diaphragm 21 (in the present case "2") the compensating setting member 27 is set, in that the diaphragm value of the initial aperture of the lens diaphragm 21 which can be read on the diaphragm scale 28 is placed opposite to the nondisplaceable reference mark 29. At the same time the setting mark 31 has departed from the reference mark 29, whereby it is indicated that the changeover switch 30 has released the closer rocker 18. As a result of the return spring 17 the closer rocker 18 is coupled with the closer arm 19 of the closer lever 13.

According to the desired exposure time and the sensitivity of the kind of film inserted, the slider 5 is set. Then through the movement of the stop-setting member 10 the compensating resistance 4 is rotated until the pointer 7 stands opposite to the measurement mark 8, that is to say the measurement bridge is balanced. In this position the setting index 26 points to the value of the diaphragm scale 28 which in combination with the set exposure time and the film sensitivity produces a correctly exposed picture.

On depression of the camera release 14 the closer lever 13 is pivoted by means of the strong spring 16 in the counterclockwise direction until the stop arm 12 is in contact with the stop cam 11. At the same time by means of the closer arm 19 the closer rocker 18 is rotated against the return spring 17 and thus the closer plunger 34 is pressed in. The lens diaphragm 21 follows this movement of the closer plunger 34 due to the closer spring 25 against the weaker opening spring 22, so that the lens diaphragm 21 closes itself to the diaphragm value set by the stop cam 11 (in the present case "4"). On further pressing down of the camera release 14 the camera shutter is released in known manner.

After the photographic picture has been taken the camera release 14 returns into the rest position. The closer rocker 18 follows this movement due to the opening spring 22 and the return spring 17, so that the lens diaphragm 21 is fully opened again.

If an exposure-measurement is to be carried out with the working aperture set, that is to say with the lens diaphragm partially closed (see FIG. 2), then both the setting mark 31 of the compensating setting member 27 and the setting index 26 of the stop-setting member 10 are placed opposite to the reference mark 29 fast with the housing. In this position the changeover switch 30 comes into engagement with the switch arm 32 and rotates the closer rocker 18 against the return spring 17. Thus the closer plunger 34 is pressed in completely and the lens diaphragm 21 is moved towards the setting stop 24 of the presetting ring 23 against the weaker opening spring 22 as a result of the action of the closer spring 25. The lens diaphragm 21 can directly follow the rotation of the presetting ring 23 with the setting stop 24 then. The presetting ring 23 is now rotated until the pointer 7 stands opposite to the measurement mark 8. This diaphragm value (in the present case "8" see FIG. 2) corresponds to correct setting according to brightness. The lens diaphragm 21 is thus set according to this diaphragm value. Exposure time and film sensitivity have previously been set by rotation of the slider 5.

On depression of the camera release the closer lever 13 is held against rotation by the top cam 11.

Further forms of embodiment are conceivable for example in that a rotatably mounted galvanometer is geared with the stop-setting member 10 and the measurement mark 8 is geared with the setting members for exposure time and film sensitivity. Furthermore the presetting ring 23 on the lens could also be replaced by a second setting ring arranged on the camera. It is essential for the realization of the invention that both a stop setting member (see member 10 with cam 11) coupled with the exposure-measuring device and a presetting means (see presetting ring 23 and setting stop 24) directly varying the diaphragm aperture should be provided for use according to choice.

We claim:
1. In a photographic camera having a housing, a shutter release means mounted on the housing, exposure time and film sensitivity controls mounted on the housing and an interchangeable objective lens assembly mounted on the housing having a spring diaphragm with an aperture control, the provision of an exposure measuring device mounted on the housing including:
 a. a source of supply voltage,
 b. a photoelectric cell disposed in the path of rays passing through the objective lens and connected in circuit with the source of supply voltage,
 c. an adjustable resistive means connected in a balancing circuit with the photoelectric cell and influenced by the exposure time and film sensitivity controls of the camera,
 d. an indicating means connected in circuit with the resistive means and the photoelectric cell and adapted to indicate the state of balance of the balancing circuit,
 e. opening means for holding the diaphragm in a fully open position,
 f. diaphragm setting means actuable by the shutter release to move the diaphragm away from the fully open position to an aperture required for accurate exposure
 g. a stop moveable by a stop-setting member adapted to influence the reading of the indicating means which stop is connectable with the diaphragm setting means when the shutter release is operated, to define at balance the required aperture and
 h. switch means adapted to selectively disengage or engage the diaphragm setting means from the stop and to connect or disconnect the diaphragm to the aperture control whereby exposure measurement is enabled at a working aperture preset by the aperture control or at maximum aperture automatically closeable to a measured value respectively.

2. A photographic camera according to claim 1 wherein the stop-setting member is provided with an indicating member moveable over a diaphragm aperture scale to indicate the preset value.

3. A photographic camera according to claim 2 wherein a fixed mark is provided on the camera housing and the aperture scale is carried by the switch means, the switch means being moveable relative to the fixed mark to indicate the maximum aperture value of the attached objective lens assembly.

4. A photographic camera according to claim 1 wherein the stop setting member is provided with a geared connection to the adjustable resistive means.

5. A photographic camera according to claim 1 wherein the diaphragm setting means is provided with a lever pivotable from one side by the shutter release means and a spring means connected between the other side of the lever and the diaphragm aperture control adapted to urge the diaphragm towards the preset position when the shutter release is operated.